United States Patent
Boutami

(10) Patent No.: US 11,048,044 B2
(45) Date of Patent: Jun. 29, 2021

(54) COLLIMATION DEVICE

(71) Applicant: Commissariat à l'Énergie Atomique et aux Énergies Alternatives, Paris (FR)

(72) Inventor: Salim Boutami, Grenoble (FR)

(73) Assignee: Commissariat à l'Énergie Atomique et aux Énergies Alternatives, Paris (FR)

(*) Notice: Subject to any disclaimer, the term of this patent is extended or adjusted under 35 U.S.C. 154(b) by 0 days.

(21) Appl. No.: 16/475,045

(22) PCT Filed: Dec. 18, 2017

(86) PCT No.: PCT/FR2017/053672
§ 371 (c)(1),
(2) Date: Jun. 28, 2019

(87) PCT Pub. No.: WO2018/122493
PCT Pub. Date: Jul. 5, 2018

(65) Prior Publication Data
US 2019/0331857 A1   Oct. 31, 2019

(30) Foreign Application Priority Data

Dec. 29, 2016 (FR) .................................... 1663501

(51) Int. Cl.
*G02B 6/26* (2006.01)
*G02B 27/30* (2006.01)

(52) U.S. Cl.
CPC .............. *G02B 6/26* (2013.01); *G02B 27/30* (2013.01)

(58) Field of Classification Search
CPC ................................ G02B 6/26; G02B 27/30; G02B 2006/12178; G02B 6/264; G02B 6/305; G02B 6/12004; G02B 6/1228
See application file for complete search history.

(56) References Cited

U.S. PATENT DOCUMENTS

| 5,039,627 | A | * | 8/1991 | Menigaux | H01S 5/4043 438/35 |
| 5,499,261 | A | * | 3/1996 | Welch | G02B 6/12004 372/44.01 |
| 8,411,536 | B1 | * | 4/2013 | Peng | G02B 6/0285 369/30.01 |
| 2003/0035620 | A1 | | 2/2003 | Manolatou | |
| 2003/0044118 | A1 | * | 3/2003 | Zhou | G02B 6/1228 385/43 |
| 2005/0259935 | A1 | | 11/2005 | Hamada | |

(Continued)

OTHER PUBLICATIONS

International Preliminary Report on Patentability for International Application No. PCT/FR2017/053672, dated Jul. 11, 2019.

(Continued)

*Primary Examiner* — Ellen E Kim
(74) *Attorney, Agent, or Firm* — Wolf, Greenfield & Sacks, P.C.

(57) ABSTRACT

A device of collimation of a light beam including a monomode waveguide, a first element of collimation of the light beam parallel to a first plane and a second element of collimation of the light beam parallel to a second plane, the first collimation element coupling the waveguide to the second collimation element.

11 Claims, 7 Drawing Sheets

(56) References Cited

U.S. PATENT DOCUMENTS

2008/0107417 A1* 5/2008 Pitwon ............... G02B 6/29308
398/82
2010/0135615 A1 6/2010 Ho et al.
2016/0011375 A1 1/2016 Anderson et al.

OTHER PUBLICATIONS

International Search Report and Written Opinion for International Application No. PCT/FR2017/053672, dated Mar. 12, 2018.
Roelkens et al., Efficient silicon-on-insulator fiber coupler fabricated using 248-nm-deep UV lithography. IEEE Photonics Technology Letters. Dec. 2005;17(12):2613-5.
Sun et al., Cantilever couplers for intra-chip coupling to silicon photonic integrated circuits. Optics Express. Mar. 16, 2009;17(6):4565-74.
PCT/FR2017/053672, dated Mar. 12, 2018, International Search Report and Written Opinion.

* cited by examiner

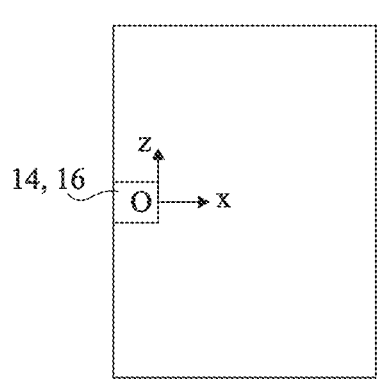
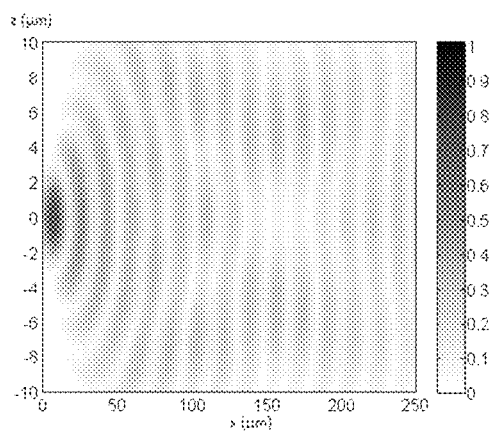
Fig 4A    Fig 4B
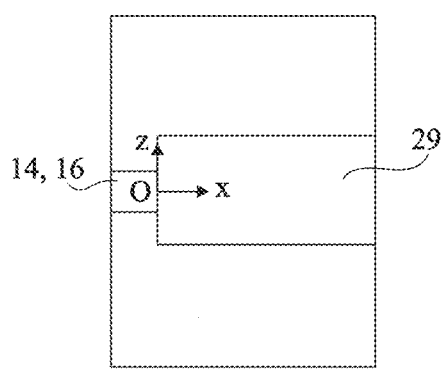
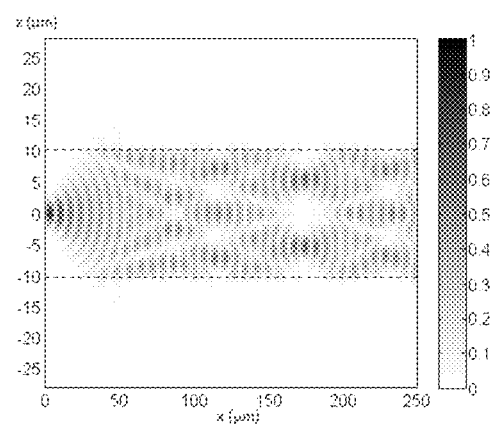
Fig 5A    Fig 5B
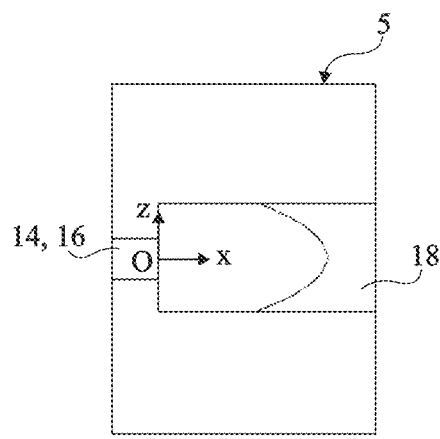
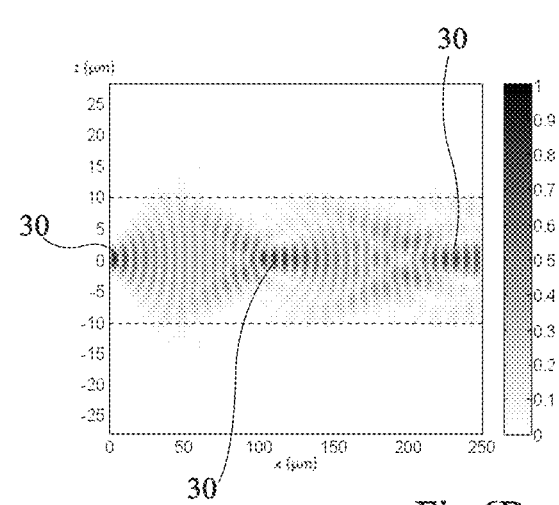
Fig 6A    Fig 6B

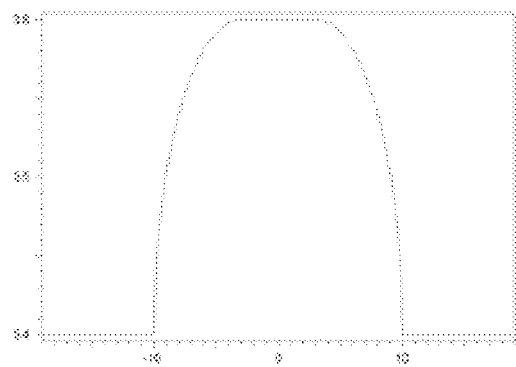 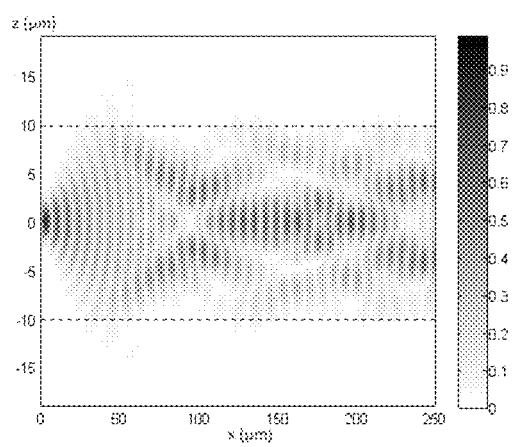
Fig 13A  Fig 13B
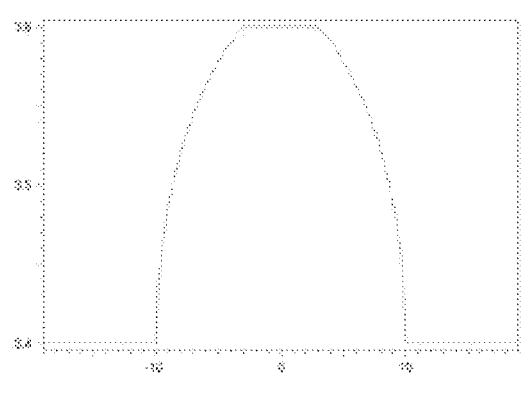 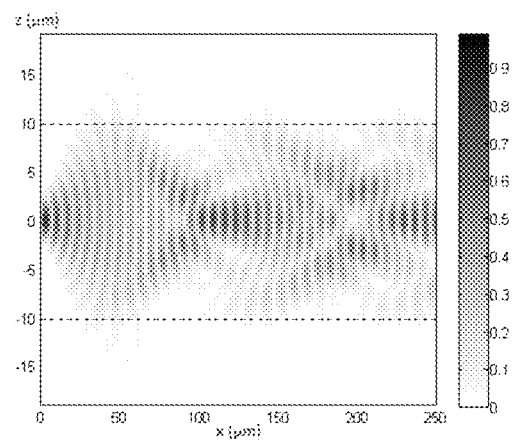
Fig 14A  Fig 14B

COLLIMATION DEVICE

This application is a national stage filing under 35 U.S.C. 371 of International Patent Application Serial No. PCT/FR2017/053672, filed Dec. 18, 2017, which claims priority to French patent application FR16/63501, filed Dec. 29, 2016. The entire contents of these applications are incorporated herein by reference in their entireties.

BACKGROUND

The present invention generally concerns optoelectronic circuits made up of semiconductor materials and methods of manufacturing the same. The present invention more specifically relates to optoelectronic circuits comprising a collimation device.

DISCUSSION OF THE RELATED ART

An optoelectronic circuit is generally intended to be coupled to an external system, for example, an optical fiber or another optoelectronic circuit. The optoelectronic circuit should then emit a light beam which is received by the external system. For this purpose, the optoelectronic circuit generally comprises a collimation device which enables to provide a collimated light beam and which further enables to adapt the size of the emitted light beam according to the external system having the optoelectronic circuit coupled thereto. A collimated light beam is a beam having substantially parallel rays so that the beam only has a low divergence.

An example of a collimation device comprises a point-shaped silicon element housed in a cladding. Such a type of collimation device is described in the publication entitled "Cantilever couplers for intra-chip coupling to silicon photonic integrated circuits" by Peng Sun and Ronald M. Reano (Mar. 16, 2009/Vol. 17, No. 6/OPTICS EXPRESS 4565).

A disadvantage of such a collimation device is that it requires the manufacturing of a very fine point having dimensions which should be accurately obtained, given that a variation of the dimensions of the point may significantly disturb the operation of the collimation device. It may however be difficult to precisely and reproducibly manufacture a very fine point with specific dimensions at an industrial scale. Further, for certain applications, a collimation device comprising a point-shaped element may not enable to sufficiently collimate the light beam emitted by the optoelectronic circuit.

SUMMARY

An object of an embodiment is to overcome all or part of the disadvantages of the previously-described collimation devices.

Another object of an embodiment is for the collimation device to deliver a substantially collimated light beam.

Another object of an embodiment is for the collimation device to have a simple structure.

Another object of an embodiment is to be able to form the collimation device at an industrial scale with conventional integrated circuit manufacturing technologies.

Thus, an embodiment provide a light beam collimation device comprising a monomode waveguide, a first element of collimation of the light beam parallel to a first plane and a second element of collimation of the light beam parallel to a second plane, the first collimation element coupling the waveguide to the second collimation element.

According to an embodiment, the first collimation element comprises a body coupled at a first end to the waveguide and coupled at a second end to the second collimation element and having a dimension along a first direction perpendicular to the first plane increasing from the first end to the second end.

According to an embodiment, the second collimation element comprises a refraction index at the wavelength of the light beam which, along a second direction perpendicular to the second plane, increases from a first value $n_g$ to a second value $n_c$ and then decreases from the second value to the first value.

According to an embodiment, the refraction index at the wavelength of the light beam of the second collimation element varies along the second direction at least partly according to a parabolic law.

According to an embodiment, the refraction index at the wavelength of the light beam of the second collimation element, along the second direction, increases from the first value to the second value, comprises a plateau at the second value, and then decreases from the second value to the first value.

According to an embodiment, the refraction index at the wavelength of the light beam increases from the first value to the second value in a first portion slower than a parabolic law and then, in a second portion, faster than the parabolic law.

According to an embodiment, the second collimation element has a half-height H along the second direction and has a length $L_4$ along a third direction parallel to the first plane and to the second plane, length $L_4$ being provided by the following relation:

$$L_4 = \frac{\pi H n_c}{2\sqrt{n_c^2 - n_g^2}}$$

According to an embodiment, the second collimation element comprises at least one alloy having its composition varying along the second direction.

According to an embodiment, the second collimation element comprises a stack along the second direction of a plurality of layers of materials having different refraction indexes at the wavelength of the light beam.

According to an embodiment, the second collimation element comprises an alternation of first and second layers, each first layer being made of a first material having a first refraction index at the wavelength of the light beam and each second layer being made of a second material having a second refraction index at the wavelength of the light beam.

According to an embodiment, the thicknesses of the first layers are not identical and the thicknesses of the second layers are not identical.

An embodiment also provides a method of manufacturing the collimation device such as previously defined, comprising the successive steps of:

forming a first portion of the second collimation element;

forming the waveguide and the first collimation element; and forming a second portion of the second collimation element.

BRIEF DESCRIPTION OF THE DRAWINGS

The foregoing and other features and advantages will be discussed in detail in the following non-limiting description of specific embodiments in connection with the accompanying drawings, in which:

FIGS. 4A, 5A, and 6A show cross-section views similar to FIG. 2 of collimation devices respectively used for first, second, and third simulations, and FIGS. 4B, 5B, and 6B show isoline maps of the component along direction (Oy) of the magnetic excitation field respectively obtained for the first, second, and third simulations;

FIGS. 13A and 14A show curves of the variation of the refraction index in an element of the collimation device respectively for fourth and fifth simulations and FIGS. 13B and 14B show isoline maps of the component along direction (Oy) of the magnetic excitation field respectively obtained for the fourth and fifth simulations.

DETAILED DESCRIPTION

Figure 1:
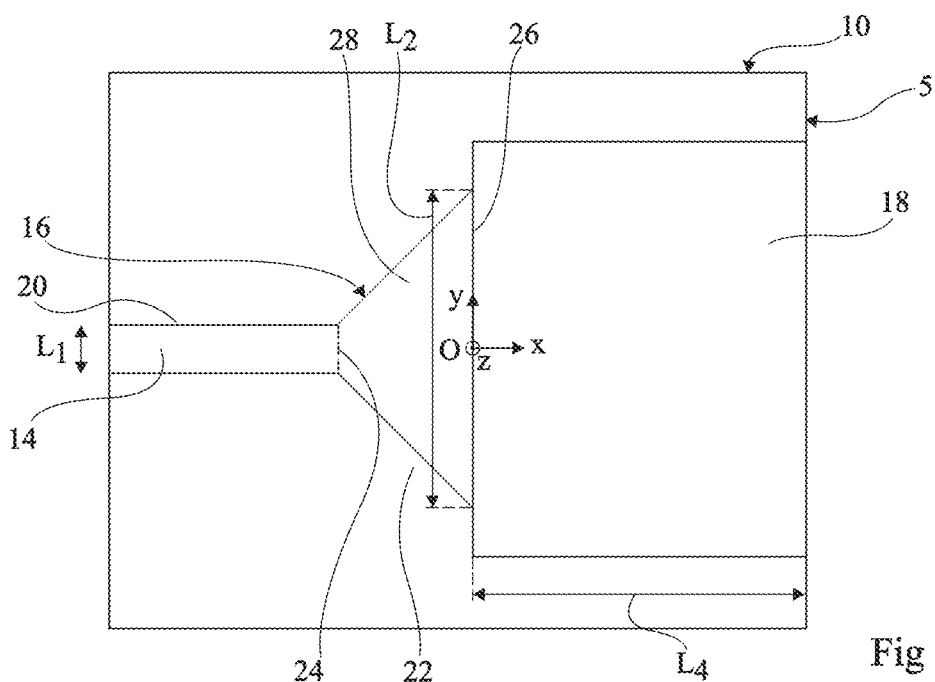
FIGS. 1 and 2 respectively are a top view and a cross-section view, partial and simplified, of an embodiment of a collimation device comprising first and second collimation elements.

The same elements have been designated with the same reference numerals in the different drawings. For clarity, only those steps and elements which are useful to the understanding of the described embodiments have been shown and are detailed. In particular, the possible structures of an optoelectronic circuit are well known by those skilled in the art and will not be described in detail hereafter. The terms "approximately", "substantially", and "in the order of" are used herein to designate a tolerance of plus or minus 10%, preferably of plus or minus 5%, of the value in question.

In the following description, an orthonormal reference frame (Oxyz) is considered. In an embodiment, the collimation device is formed by a stack of semiconductor layers along a stacking direction corresponding to direction (Oz).

Figure 2:
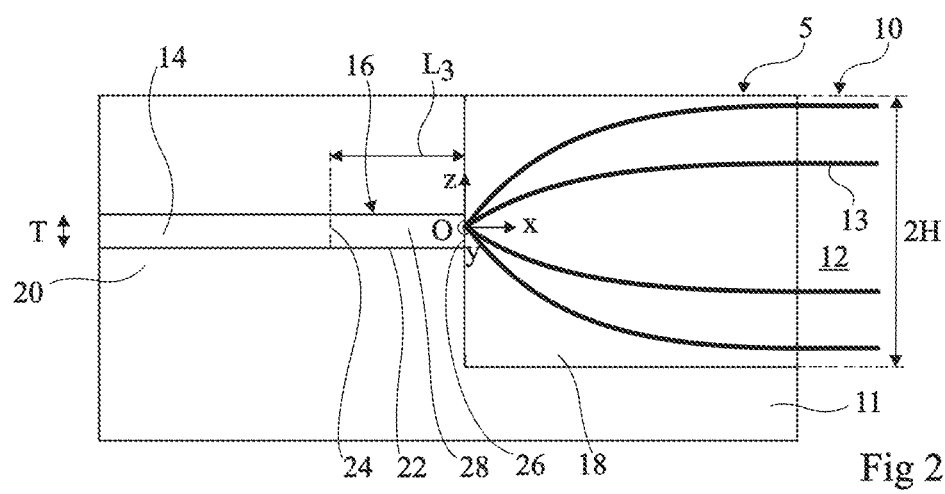

FIGS. 1 and 2 respectively are a top view and a cross-section view, partial and simplified, of an embodiment of a collimation device 5. Collimation device 5 forms part of an optoelectronic circuit 10 which is only partially shown in the drawings. Optoelectronic circuit 10 may in particular comprise at least one optical signal generation device, for example, a laser source, optical signal transmission devices, optical signal processing (modulation, amplification) devices, and/or optical signal conversion devices. A substrate 11 having collimation device 5 formed thereon has been schematically shown in FIG. 2.

Collimation device 5 enables to emit a collimated light beam 12 having rays substantially parallel to direction (Ox). FIG. 2 shows rays 13 of beam 12. Light beam 12 may be a monochromatic or polychromatic beam. Light beam 12 is preferably substantially monochromatic. When beam 12 is polychromatic, the wavelength of the beam may take different values over a wavelength range. The wavelength of the light beam collimated by collimation device 5 is called wavelength of interest hereafter. In the following description, unless otherwise indicated, when the refraction index of a material is mentioned, this designates the refraction index at the wavelength of interest.

According to an embodiment, collimation device 5 has a structure with a planar symmetry with respect to plane (Oxy) and with respect to plane (Oxz).

Collimation device 5 comprises three elements:
a monomode waveguide 14;
a first element 16 which enables to collimate the light rays parallel to a first plane P1, for example, plane (Oxz); and
a second element 18 which enables to collimate the light rays parallel to a second plane P2, for example, plane (Oxy), different from first plane P1 and preferably substantially perpendicular to first plane P1.

Waveguide 14 is made of a first material, for example, a first semiconductor material, and is surrounded with a cladding 20 made of a second material, for example, a second semiconductor material. The refraction index of the first material is greater than the refraction index of the second material. The selection of the first and second materials depends, in particular, on the wavelength of the light beam to be collimated.

According to an example, for the collimation of a monochromatic beam having a wavelength which may vary from 2 μm to 12 μm, the first material may be an alloy of silicon and germanium (SiGe) and the second material may be silicon (Si). According to another example, for the collimation of a monochromatic beam used in telecommunications and having a wavelength in vacuum which may be in the order of 1.55 μm, the first and second materials may correspond to semiconductor materials mainly comprising a III-V compound, for example, a III-N compound, particularly when collimation device 5 is provided on an optoelectronic circuit 10 comprising a light beam generation device, for example, a laser diode. Examples of group-III elements comprise gallium (Ga), indium (In), or aluminum (Al). Examples of III-N compounds are GaN, AlN, InN, InGaN, AlGaN, or AlInGaN. Other group-V elements may also be used, for example, phosphorus (P) or arsenic (As). According to another example, for the collimation of a monochromatic beam used in telecommunications and having a wavelength in vacuum which may be in the order of 1.55 μm, the first material may be Si and the second material may be silicon dioxide ($SiO_2$), particularly when collimation device 5 is provided on an optoelectronic circuit 10 comprising no light beam generation device. For this case, silicon nitride (SiN) may also be envisaged as a first material and silicon dioxide ($SiO_2$) may be envisaged as a second material.

Due to its dimensions, waveguide 14 only allows the propagation of an electromagnetic radiation at the wavelength of interest along a propagation mode. According to an embodiment, waveguide 14 has a rectangular cross-section having a height T, measured along direction (Oz), and a length $L_1$, measured along direction (Oy).

First collimation element 16 is made of the first material and is surrounded with a cladding 22 made of the second material. First collimation element 16 comprises a first end 24 connected to an end of waveguide 14 and a second end 26 connected to second collimation element 18 and a body 28 extending between first end 24 and second end 26. Body 28 has a diverging shape from first end 24 to second end 26. According to an embodiment, first collimation element 16 has a rectangular cross-section having the same height T, measured along direction (Oz), as the waveguide and having a width, measured along direction (Oy), increasing from width $L_1$ at first end 24 to a width $L_2$ to second end 26. Call length $L_3$ of first collimation element 16 the distance measured along direction (Ox) between first end 24 and second end 26.

According to an embodiment, first collimation element 16 has, in top view, the shape of a trapeze having its small base corresponding to first end 24 and having a large base corresponding to second end 26.

Height T may be in the range from 0.1 µm to 10 µm. Width $L_1$ may be in the range from 0.1 µm to 10 µm. Width $L_2$ may be in the range from 1 µm to 100 µm. Length $L_3$ may be in the range from 10 µm to 1 mm.

Second collimation element 18 has a height 2*H measured along direction (Oz) and a length $L_4$, measured along direction (Ox).

Second collimation element 18 comprises a refraction index which is substantially constant in any plane parallel to plane (Oxy) and which, along direction (Oz), increases from a minimum refraction index $n_g$ to a maximum refraction index $n_c$, and then decreases to the minimum refraction index $n_g$. The refraction index is equal to the maximum refraction index $n_c$ for z equal to 0 and is equal to the minimum refraction index $n_g$ for z equal to ±H.

The variation law of the index gradient in second collimation element 18 is selected to enable to obtain a collimation of the beam emitted by second collimation element 18.

According to an embodiment, in second collimation element 18, refraction index n varies parabolically, for example, according to the following relation (I):

$$n^2(z) = n_c^2 \left[ 1 - \left( \frac{n_c^2 - n_g^2}{n_c^2} \right) \left( \frac{z}{H} \right)^2 \right] \quad (I)$$

for z in the range from −H to H.

The gradient of the index, which results in curving the light, is linked to the derivative of relation (I). The gradient is zero for plane (Oxy) and increases as the distance to plane (Oxy) increases. The more a ray becomes distant from plane (Oxy), the more it tends to be curved to return to plane (Oxy). Since the index is smaller, it also propagates faster.

Figure 3:
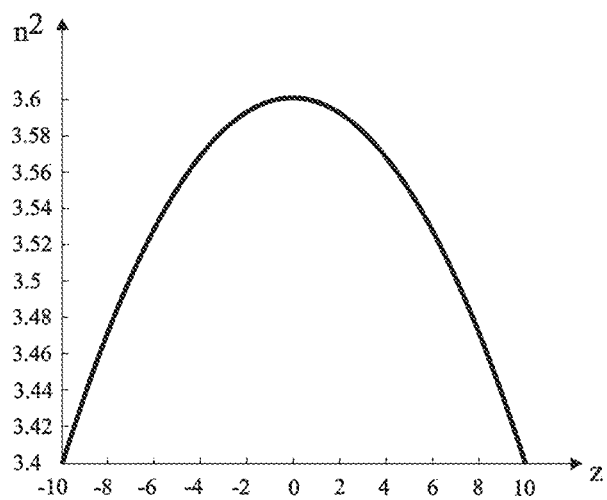
FIG. 3 shows a curve of the variation of the refraction index in an embodiment of the second element of the collimation device shown in FIGS. 1 and 2.

FIG. 3 shows the curve of variation of the squared refraction index $n^2$ in second collimation element 18 according to relation (I) along direction (Oz).

Collimation device 5 operates as follows. At the output of waveguide 14, the light beam is widened in direction (Oy) so that, at second end 26, the light beam is substantially collimated parallel to plane (Oxz). In second collimation element 18, due to the index gradient along direction (Oz), the light rays follow curved paths in planes substantially parallel to plane (Oxz) periodically oscillating along propagation direction (Ox).

Length $L_4$ is then selected so that the light rays escape from second collimation element 18 while being substantially parallel to plane (Oxy). A collimation of the beam parallel to direction (Ox) is thus obtained.

Length $L_4$ is provided by the following relation (II):

$$L_4 = \frac{\pi H n_c}{2\sqrt{n_c^2 - n_g^2}} \quad (II)$$

Preferably, in the case where the incident beam is polychromatic, refraction indexes $n_c$ and $n_g$ are substantially independent from the wavelength over the wavelength range of the beam so that a collimation of the beam is obtained over the entire wavelength range of the beam.

First, second, and this simulations have been performed by time domain finite difference calculation.

FIGS. 4A, 5A, and 6A show cross-section views similar to FIG. 2 of the collimation devices respectively used for the first, second, and third simulations. In the first simulation, the collimation device had the structure shown in FIGS. 1 and 2, with the difference that second collimation element 18 was not present. In the second simulation, the collimation device had the structure shown in FIGS. 1 and 2, with the difference that second collimation element 18 was replaced with an element 29 of same dimensions but having a constant refraction index. In the third simulation, collimation device 5 had the structure shown in FIGS. 1 and 2.

For the first, second, and third simulations, the wavelength of interest λ was 4.5 µm. For the three simulations, waveguide 14 and first collimation element 16 were made of SiGe with 40 wt. % of germanium, which has a refraction index at 4.5 µm of 3.6, and claddings 20 and 22 were made of Si, which has a refraction index at 4.5 µm of 3.4. Height T was 3 µm and height H was 10 µm. The radiation propagating in waveguide 14 had a TM polarization, that is, the magnetic field was oriented along (Oy).

FIGS. 4B, 5B, and 6B show isoline maps of the component along direction (Oy) of the magnetic excitation field obtained with the first, second, and third simulations.

FIG. 4B shows the diffraction of the light beam in the absence of the second collimation element. FIG. 5B shows a lack of collimation of the light beam in element 29. FIG. 6B shows that the structure of collimation device 5 of FIG. 6A causes an alternation of collimation and of focusing of the light beam. To obtain the emission of a collimated light beam, one just has to select length $L_4$ so that second collimation element 18 stops at a location where the beam is collimated, that it, halfway between two nodes 30 where the light beam is concentrated in a small area. FIG. 6B shows that it is sufficient to select $L_4$ equal to 47 µm, which can further be deduced from relation (II).

Figure 7:
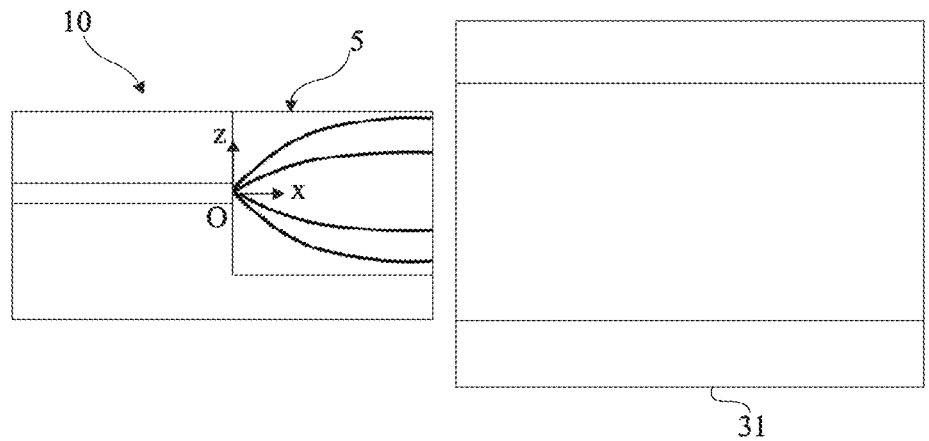
FIGS. 7 and 8 illustrate two applications of the collimation device shown in FIGS. 1 and 2.

FIG. 7 illustrates an application of collimation device 5 where optoelectronic circuit 10 is coupled to an optical fiber 31, collimation device 5 being arranged opposite an end of optical fiber 31.

Figure 8:
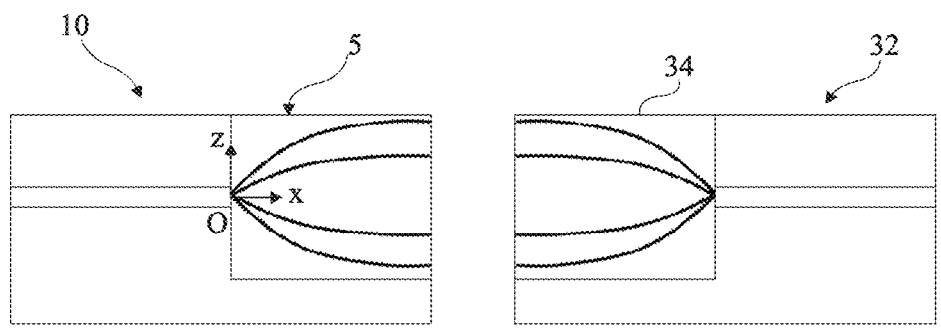

FIG. 8 illustrates another application of collimation device 5 where optoelectronic circuit 10 is coupled to another optoelectronic circuit 32, collimation device 5 being placed opposite another collimation device 34 of optoelectronic circuit 32, which may have the same structure as collimation device 5.

Advantageously, for the applications illustrated in FIGS. 7 and 8, the light beam emitted by collimation device 5 having a large size, a significant alignment tolerance may be obtained.

Figure 9:
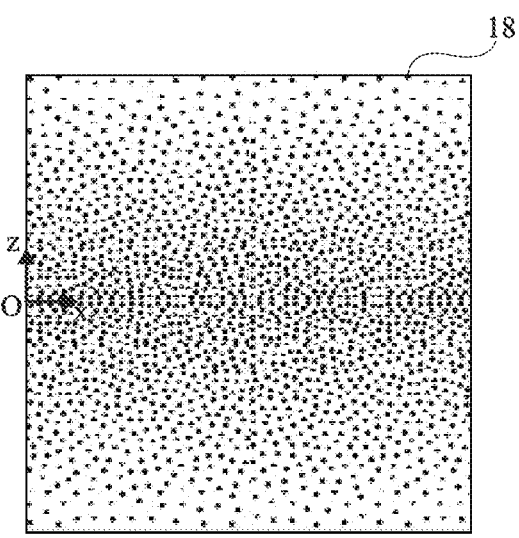
FIGS. 9, 10, and 11 are cross-section views similar to FIG. 2 illustrating three embodiments of the second collimation element of the collimation device.

FIG. 9 illustrates an embodiment of second collimation element 18. In this embodiment, second collimation element 18 is formed by deposition, for example, by epitaxy, of a semiconductor layer having its composition modified continuously during the deposition to obtain the desired variation of the refraction index, particularly according to relation (I). When the second collimation element 18 corresponds to an alloy of a first element and of a second element, for example, SiGe, the variation of the refraction index may be obtained by continuously varying the proportion of the first element with respect to the second element in the alloy during the deposition of the alloy.

Figure 10:
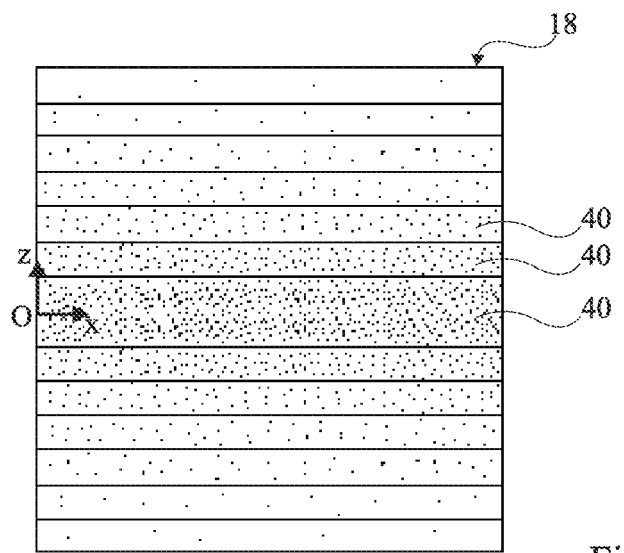

FIG. 10 illustrates another embodiment of second collimation element 18. In this embodiment, second collimation element 18 is formed by a stack of a plurality of semiconductor layers 40 having different compositions, each layer 40 having a homogeneous composition selected to obtain a determined refraction index. A stepped variation of the refraction index along direction (Oz), which may for example approximately follow relation (I), is then obtained. The method of manufacturing second collimation element 18 according to the embodiment illustrated in FIG. 10 may be simpler than the method of manufacturing second collimation element 18 according to the embodiment illustrated in FIG. 9.

Figure 11:
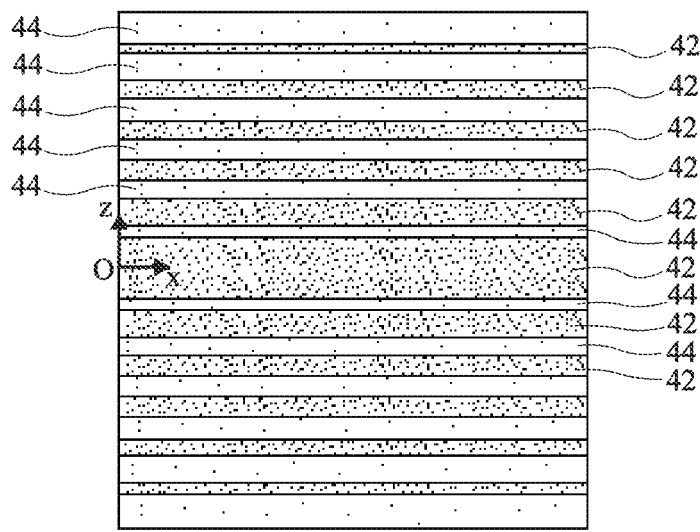

FIG. 11 illustrates another embodiment of second collimation element 18. In this embodiment, second collimation element 18 is formed by a stack along direction (Oz) comprising an alternation of first layers 42 having a first composition, and thus a first refraction index $n_c$, and of second layers 44 having a second composition, and thus a second refraction index $n_g$. The thicknesses of layers 42 and 44 are smaller than at least one fifth of the wavelength of interest so that the light crossing second collimation element 18 locally sees a mean refraction index related to the ratio of the thicknesses of the closest first and second layers 42 and 44. The thicknesses of the first and second layers are then selected so that the local mean refraction index varies as desired along direction (Oz), for example, approaching relation (I). The method of manufacturing second collimation element 18 according to the embodiment illustrated in FIG. 11 may be simpler than the method of manufacturing second collimation element 18 according to the embodiment illustrated in FIG. 10.

FIGS. 12A to 12H are partial simplified cross-section views of the structures obtained at successive steps of an embodiment of a method of manufacturing the collimation device 12 shown in FIGS. 1 and 2 for which second collimation element 18 may have one of the structures shown in FIG. 9, 10, or 11. In FIGS. 12A to 12H, direction (Oz), not shown, corresponds to the vertical direction.

Figure 12A:
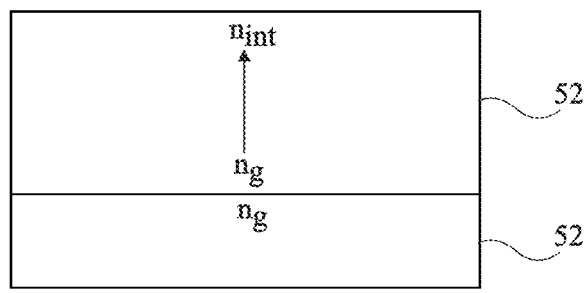
FIGS. 12A to 12H are partial simplified cross-section views of structures obtained at successive steps of another embodiment of a method of manufacturing the collimation device shown in FIGS. 1 and 2.

The method comprises the successive steps of:

(1) Forming, for example, by epitaxy, on a substrate 50 having at its top a refraction index equal to $n_g$, a layer 52 having a refraction index varying along direction (Oz) from $n_g$ at the base of layer 52 to $n_{int}$ at the top of layer 52, $n_{int}$ being greater than $n_g$ (FIG. 12A). Substrate 50 may correspond to a monoblock structure or to a layer covering a support made of another material. Substrate 50 may be a semiconductor substrate, for example, a substrate made of silicon, of germanium, of silicon carbide, of a III-V compound such as GaN or GaAs, or a ZnO substrate. Substrate 50 may correspond to a multilayer structure of silicon-on-insulator type, also called SOI. Layer 52 may have one of the structures shown in FIG. 9, 10, or 11.

Figure 12B:
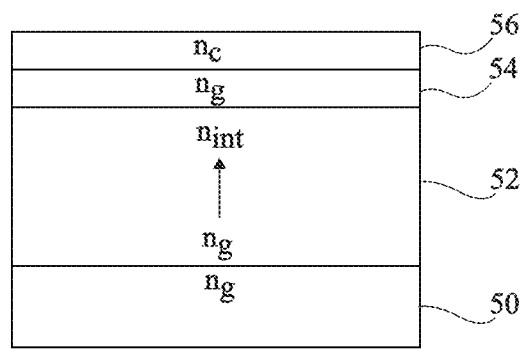

(2) Depositing a layer 54 of a material having a refraction index equal to $n_g$ and a layer 56 of a semiconductor material having a refraction index equal to $n_c$, which is greater than $n_{int}$ (FIG. 12B).

Figure 12C:
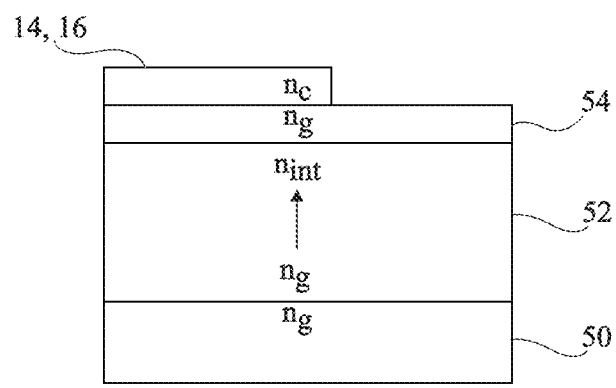

(3) Etching a portion of layer 56 with a stop on layer 54 to delimit waveguide 14 and first collimation element 16 (FIG. 12C).

Figure 12D:
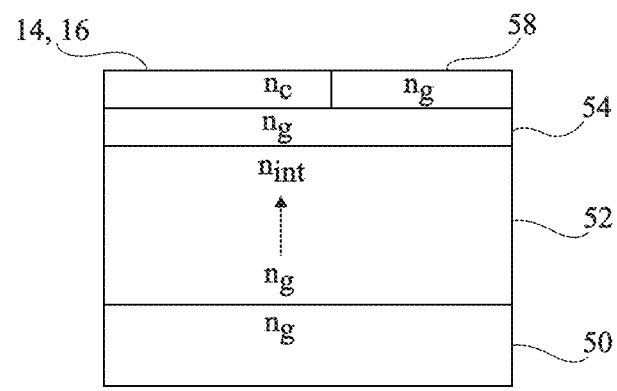
Figure 12E:
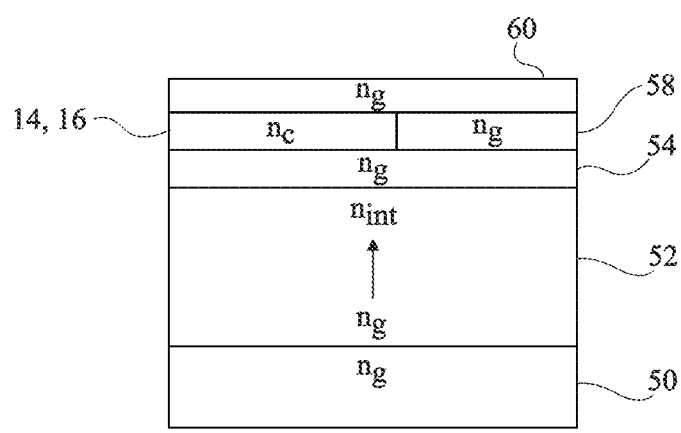

(4) Depositing a layer of the material having a refraction index equal to $n_g$ over the entire structure and etching the layer, for example, by a chemical-mechanical planarization or CMP, to delimit a layer 58 of same height as waveguide 14 and first collimation element 16 around them (FIG. 12D);

(5) Depositing a layer 60 of the material having a refraction index equal to $n_g$ over the entire structure (FIG. 12E).

Figure 12F:
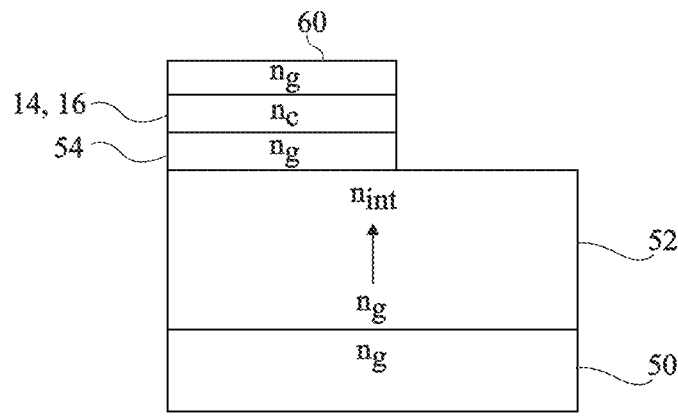

(6) Etching the portions of layers 54, 58, and 60 at the desired location of second collimation element 18 (FIG. 12F).

Figure 12G:
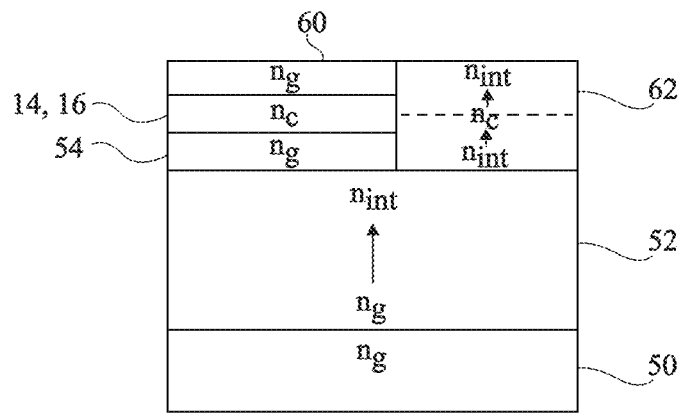

(7) Forming, for example, by epitaxy, over the entire structure, a layer having a refraction index increasing along direction (Oz) from $n_{int}$ at the base of the layer to $n_c$ in the middle of the layer and then decreasing to $n_{int}$ at the top of the layer and etching the layer, for example, by chemical-mechanical planarization, with a stop on layer 60 to delimit a layer 62 resting on layer 52 (FIG. 12G). Layer 62 may have one of the structures shown in FIG. 9, 10, or 11.

Figure 12H:
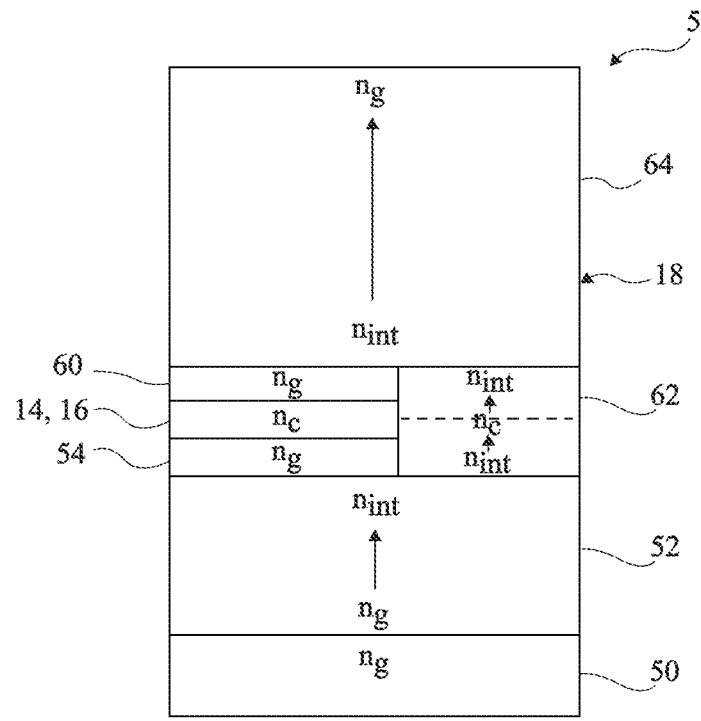

(8) Forming, for example, by epitaxy, over the entire structure, a semiconductor layer 64 having a refraction index increasing along direction (Oz) from $n_{int}$ at the base of the layer to $n_g$ at the top of the layer (FIG. 12H). Layer 64 may have one of the structures shown in FIG. 9, 10, or 11.

Second collimation element 18 is formed by layers 52, 62, and 64. Cladding 20 of waveguide 14 and cladding 22 of first collimation element 16 are formed by layers 54, 58, and 60.

Another embodiment of a manufacturing method comprises all the previously-described steps, with the difference that steps (1), (7), and (8) are respectively replaced with the following steps (1)', (7)', and (8)':

(1)' identical to previously-described step (1), with the difference that the refraction index varies along direction (Oz) from value $n_g$ at the base of layer 52 to value $n_c$ at the top of the layer;

(7)' identical to previously-described step (7), with the difference that the refraction index of layer 62 is constant and equal to $n_c$;

(8)' identical to previously-described step (8), with the difference that the refraction index varies along direction (Oz) from value $n_c$ at the base of layer 64 to value $n_g$ at the top of layer 64.

The present embodiment has the advantage that the forming of layer 62 is simpler, particularly at the etch step previously described at step (7)'. However, the structure of second collimation element 18 then does not enable to obtain a variation profile of the refraction index which follows the previously-described relation (I) since the refraction index in central layer 62 of second collimation element 18 is constant.

Further, the inventor has shown that when the refraction index is constant in central layer 62, the index gradient in layers 52 and 64 cannot follow a parabolic law. Indeed, in this case, it is not possible to obtain a proper collimation of the beam emitted by second collimation element 18. The inventor has shown that, to obtain a proper collimation, the refraction index should vary in second collimation element 18 according to the following relations (III), considering that central layer 62 extends from z equal to $-z_0$ to z equal to $z_0$:

for z in the range from $-z_0$ to $z_0$:

$$n^2(z) = n_c^2 \qquad \text{(III)}$$

for z in the range from $-z_0$ to H:

$$n^2(z) = n_c^2 \left[ 1 - \left( \frac{n_c^2 - n_g^2}{n_c^2} \right) \left[ \left( \frac{H - 3z_0}{H - z_0} \right) \left( \frac{z - z_0}{H - z_0} \right)^2 + \left( \frac{2z_0}{H - z_0} \right) \left( \frac{z - z_0}{H - z_0} \right) \right] \right]$$

for z in the range from $-z_0$ to $-H$:

$$n^2(z) = n_c^2 \left[ 1 - \left( \frac{n_c^2 - n_g^2}{n_c^2} \right) \left[ \left( \frac{H - 3z_0}{H - z_0} \right) \left( \frac{z + z_0}{H - z_0} \right)^2 - \left( \frac{2z_0}{H - z_0} \right) \left( \frac{z + z_0}{H - z_0} \right) \right] \right]$$

Fourth and fifth simulations have been performed by time domain finite difference calculation.

FIGS. 13A and 14A show curves of the variation of the refraction index in second collimation element 18 of the collimation devices respectively used for the fourth and fifth simulations. For the fourth and fifth simulations, the collimation device had the structure shown in FIGS. 1 and 2. The fourth and fifth simulations have been performed in the same conditions as the first, second, and third previously-described simulations.

In the fourth simulation, the refraction index of second collimation element 18 was constant for z between $-z_0$ and $+z_0$ and was following a parabolic law between $-H$ and $-z_0$ and $+z_0$ and H.

The refraction index was thus varying in second collimation element 18 according to the following relations (IV):

for z in the range from $-z_0$ to $z_0$:

$$n^2(z) = n_c^2 \quad \text{(IV)}$$

for z in the range from $z_0$ to H:

$$n^2(z) = n_c^2 \left[ 1 - \left( \frac{n_c^2 - n_g^2}{n_c^2} \right) \left( \frac{z - z_0}{H - z_0} \right)^2 \right]$$

for z in the range from $-z_0$ to $-H$:

$$n^2(z) = n_c^2 \left[ 1 - \left( \frac{n_c^2 - n_g^2}{n_c^2} \right) \left( \frac{z + z_0}{H - z_0} \right)^2 \right]$$

In the fifth simulation, the refraction index of second collimation element 18 was following a previously-described law (III).

FIGS. 13B and 14B show isoline maps of the component along direction (Oy) of the magnetic excitation field obtained in second collimation element 18 with the fourth and fifth simulations.

FIG. 13B shows that the collimation device 5 having a second collimation element 18 with the variation profile of the refraction index shown in FIG. 13A does not provide a good focusing of the light beam and thus does not provide a good collimation of the light beam at mid-distance between two focusings.

FIG. 14B shows that the collimation device 5 having its second collimation element 18 with the variation profile of the refraction index shown in FIG. 14A enables to obtain a good focusing of the light beam and thus enables to obtain a good collimation of the light beam at mid-distance between two focusings. The previous relation (II) remains valid as a first approximation.

Specific embodiments have been described. Various alterations, modifications, and improvements will readily occur to those skilled in the art.

The invention claimed is:

1. A device of collimation of a light beam comprising a monomode waveguide, a first collimation element adapted to collimate the light beam parallel to a first plane and a second collimation element adapted to collimate the light beam parallel to a second plane, different from the first plane, the first collimation element coupling the monomode waveguide to the second collimation element, wherein the second collimation element comprises a refraction index at the wavelength of the light beam which increases from a first value $n_g$ to a second value $n_c$, wherein the second collimation element has a half-height H perpendicularly to the second plane, and wherein the second collimation element has a length $L_4$ along a direction parallel to the first plane and to the second plane given by the following relation:

$$L_4 = \frac{\pi H n_c}{2\sqrt{n_c^2 - n_g^2}}.$$

2. The device of claim 1, wherein the first collimation element comprises a body coupled at a first end to the monomode waveguide and coupled at a second end to the second collimation element and having a dimension along a first direction perpendicular to the first plane increasing from the first end to the second end.

3. The device of claim 2, wherein the refraction index increases perpendicularly to the second plane from the first value $n_g$ to the second value $n_c$, and then decreases from the second value to the first value.

4. The device of claim 3, wherein the refraction index at the wavelength of the light beam of the second collimation element varies along the second direction least partly according to a parabolic index profile.

5. The device of claim 3, wherein the refraction index at the wavelength of the light beam of the second collimation element, along the second direction, increases from the first value to the second value, comprises a plateau at the second value, and then decreases from the second value to the first value.

6. The device of claim 5, wherein the refraction index at the wavelength of the light beam increases from the first value to the second value in a first portion slower than a parabolic index profile and then, in a second portion, faster than the parabolic index profile.

7. The device of claim 3, wherein the second collimation element comprises at least one alloy having its composition varying along the second direction.

8. The device of claim 3, wherein the second collimation element comprises a stack along the second direction of a plurality of layers of materials having different refraction indexes at the wavelength of the light beam.

9. The device of claim 3, wherein the second collimation element comprises an alternation of first and second layers, each first layer being made of a first material having a first refraction index at the wavelength of the light beam and each second layer being made of a second material having a second refraction index at the wavelength of the light beam.

10. The device of claim 9, wherein the thicknesses of the first layers are not identical and wherein the thicknesses of the second layers are not identical.

11. A method of manufacturing the collimation device of claim 1, comprising the successive steps of:
forming a first portion of the second collimation element;
forming the monomode waveguide and the first collimation element; and
forming a second portion of the second collimation element.

* * * * *